Patented Nov. 9, 1926.

1,606,394

UNITED STATES PATENT OFFICE.

WILLIAM C. ARSEM, OF SCHENECTADY, NEW YORK, ASSIGNOR TO COMMERCIAL SOLVENTS CORPORATION, OF TERRE HAUTE, INDIANA, A CORPORATION OF MARYLAND.

PROCESS FOR THE PRODUCTION OF FORMIC ACID.

No Drawing.   Application filed June 20, 1925.   Serial No. 38,569.

My invention relates to the production of formic acid by the combination of carbon monoxide and water in the presence of a catalytic agent. The reaction is essentially a hydrolysis of carbon monoxide by water, being reversible, and occurring in molecular proportions in accordance with the following equation:—

$$CO + H_2O \rightleftharpoons HCOOH$$

The direct interaction of carbon monoxide and water in the absence of a catalyst is theoretically possible, but equilibrium conditions are such that extremely high pressures are required to produce a detectable amount of formic acid and the theoretical conception of such a reaction has no practical importance.

The concentration of formic acid present in a water solution in equilibrium with any given pressure of carbon monoxide may be calculated from the following equation:—

$$K = \frac{P}{C} \frac{f_1}{f_0}$$

in which
P = Pressure of CO in atmospheres
C = Concentration of HCOOH in mols per 1000 g. $H_2O$.
$f_1$ = Fugacity of water in the formic acid solution.
$f_0$ = Fugacity of pure water.
K = A constant depending upon the temperature.

The following table shows the results of such a calculation.

| Conc. of HCOOH by weight | Pressure of CO in atmospheres | | |
|---|---|---|---|
| | 25° | 100° | 217.9° |
| *Per cent* | | | |
| 1 | 0.263 | 6.2 | 68.6 |
| 10 | 3. | 70.5 | 781. |
| 20 | 7.1 | 167.3 | 1850. |
| 50 | 36. | 847. | 9380. |
| 90 | 1065. | 25100. | 278000. |

The rate of this reaction is ordinarily quite slow—except at high temperatures which are impracticable for use on account of the extremely high pressures which must be jointly employed.

The object of my invention is to provide a workable process for the production of formic acid by the hydrolysis of carbon monoxide. I have discovered that when carbon monoxide gas and water vapor, in approximately equi-molecular proportions, are passed under pressure over a cuprous halide catalyst or into a solution or suspension of such a catalyst, the production of formic acid may be easily effected.

The requisite mixture of carbon monoxide and water vapor for the reaction may be obtained in several ways. For example, carbon monoxide may be generated by various methods known to chemical industry and mixed with suitable quantities of water vapor before the reaction to formic acid is effected.

I have discovered that cuprous chloride, which is the cuprous halide which I prefer to employ, when dissolved or suspended in solutions of strong acid such as sulfuric, hydrochloric, or phosphoric, is a suitable catalyst for the production of formic acid by the reaction of carbon monoxide and water. Cuprous chloride reacts with carbon monoxide in the presence of water to form a double compound which it is believed has the formula—$CuCl \cdot CO \cdot 2H_2O$. It is believed that the catalytic function of the cuprous chloride is to form this compound which immediately breaks down into formic acid, water, and cuprous chloride, thus $$CuCl + CO + 2H_2O = CuCl \cdot CO \cdot 2H_2O$$
$$CuCl \cdot CO \cdot 2H_2O = CuCl + HCOOH + H_2O$$

The following formulæ are indicative of suitable catalyst mixtures:

CuCl, 10 parts; 80% sulfuric acid, 90 parts.
CuCl, 10 parts; 10% sulfuric acid, 90 parts.
CuCl, 10 parts; 35% hydrochloric acid, 90 parts.
CuCl, 10 parts; 10% phosphoric acid, 90 parts.

The reaction may be carried out by passing carbon monoxide and water vapor under pressure through a liquid containing the catalyst in the form of a suspension or solution, or the cuprous chloride may be deposited upon a suitable "carrier" such as pumice or some other voluminous inert material, which may be moistened with the aqueous solution of the acid to be used with the cuprous chloride, and packed in a tube or vessel of suitable shape through which the gas may be passed so as to make contact with the catalyst.

When a mixture of carbon monoxide is passed over such a catalytic mass under such conditions of temperature and pressure that the formic acid catalytically formed is again volatilized, the reaction is substantially a continuous one and the continued passage of the gases over the catalyst causes the continuous formation and volatilization of formic acid. The formic acid may of course be liquefied by cooling the catalyzed gas mixture. The liquid formic acid may be continuously removed and the gases recirculated, thus making the process a continuous cyclic one.

The rate of formation of formic acid depends on the temperature, pressure, and the speed of the passage of the gaseous mixture over or through the catalyst. The temperature for the hydrolysis of the carbon monoxide in the presence of the catalyst may be quite low and in general I prefer to use temperatures of the range 50–150° C. At such temperature ranges high working pressures are not necessary and in general I prefer to use pressures of twenty atmospheres and upward.

It should be observed that the maintenance of exact pressure and temperature conditions is not essential for the practice of my catalytic process and a wide variance of these conditions is possible in obtaining satisfactory results.

Now, having fully described my invention, I claim the following as new and novel:

1. A process for the production of formic acid which comprises reacting carbon monoxide and water under pressure in the presence of a cuprous halide catalyst.

2. A process for the production of formic acid which comprises reacting carbon monoxide and water under pressure in the presence of a catalyst containing cuprous chloride.

3. A process for the production of formic acid which comprises reacting carbon monoxide and water, at a pressure exceeding 20 atmospheres, in the presence of a cuprous halide catalyst.

4. A process for the production of formic acid which comprises reacting carbon monoxide and water, at a temperature of between 50–150° C. and at a pressure exceeding twenty atmospheres, in the presence of a cuprous chloride catalyst.

5. A process for the production of formic acid which comprises reacting carbon monoxide and water, at a temperature of between 50–150° C. and at a pressure exceeding twenty atmospheres, in the presence of a mixture of cuprous chloride and a mineral acid.

6. A continuous process for the production of formic acid which comprises passing a mixture of carbon monoxide and water vapor, under pressure, over a cuprous halide-mineral acid catalyst maintained at such a temperature that the formed formic acid is volatilized, cooling the reacted gas mixture to remove the formic acid, and recirculating the gaseous mixture.

7. A continuous process for the production of formic acid which comprises passing a mixture of carbon monoxide and water vapor over a cuprous chloride-mineral acid catalyst at a temperature over 100° C., cooling the reacted gas mixture, removing the condensed formic acid, and recirculating the gaseous mixture.

In testimony whereof I affix my signature.

WILLIAM C. ARSEM.